(12) United States Patent
Hsiang

(10) Patent No.: US 11,405,650 B2
(45) Date of Patent: Aug. 2, 2022

(54) METHOD AND APPARATUS OF TRANSFORM COEFFICIENT CODING

(71) Applicant: MEDIATEK INC., Hsinchu (TW)

(72) Inventor: Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/269,620

(22) PCT Filed: Aug. 19, 2019

(86) PCT No.: PCT/CN2019/101284
§ 371 (c)(1),
(2) Date: Feb. 19, 2021

(87) PCT Pub. No.: WO2020/038311
PCT Pub. Date: Feb. 27, 2020

(65) Prior Publication Data
US 2021/0203998 A1    Jul. 1, 2021

Related U.S. Application Data

(60) Provisional application No. 62/720,949, filed on Aug. 22, 2018.

(51) Int. Cl.
*H04N 19/70* (2014.01)
*H04N 19/124* (2014.01)
(Continued)

(52) U.S. Cl.
CPC ........... *H04N 19/70* (2014.11); *H04N 19/124* (2014.11); *H04N 19/176* (2014.11); *H04N 19/50* (2014.11); *H04N 19/60* (2014.11)

(58) Field of Classification Search
CPC .... H04N 19/70; H04N 19/124; H04N 19/176; H04N 19/50; H04N 19/60
See application file for complete search history.

(56) References Cited

U.S. PATENT DOCUMENTS 10,674,146 B2    6/2020   Heo et al.
2013/0208806 A1  8/2013   Hu et al.
(Continued)

FOREIGN PATENT DOCUMENTS

EP    3 818 703 A1      5/2021
WO    2012/051033 A1    4/2012
(Continued)

OTHER PUBLICATIONS

International Search Report and Written Opinion dated Nov. 25, 2019, issued in application No. PCT/CN2019/101284.
(Continued)

*Primary Examiner* — Jae N Noh
(74) *Attorney, Agent, or Firm* — McClure, Qualey & Rodack, LLP

(57) ABSTRACT

A method and apparatus or decoding prediction residues in a video coding system are disclosed. According to this method, a first syntax element to a fourth syntax element are signalled or parsed in a first coding pass for at least sub-block. The current residual block is encoded or decoded using information comprising the first syntax element, the second syntax element, the third syntax element, and the fourth syntax element. The first syntax element indicates whether an absolute value of a current transform coefficient level is greater than 0. The second syntax element indicates whether the absolute value of the current transform coefficient level is greater than 1. The third syntax element indicates a parity of the current transform coefficient level. The fourth syntax element indicates whether the absolute value of the current transform coefficient level downward shifted by 1 is greater than 1.

20 Claims, 5 Drawing Sheets

(51) Int. Cl.
*H04N 19/176* (2014.01)
*H04N 19/50* (2014.01)
*H04N 19/60* (2014.01)

(56) References Cited

U.S. PATENT DOCUMENTS

2014/0376643 A1 12/2014 Hendrry et al.
2016/0219290 A1 7/2016 Zhao et al.
2018/0124432 A1 5/2018 Kim et al.

FOREIGN PATENT DOCUMENTS

WO 2013/096671 A1 6/2013
WO 2017/057953 A1 4/2017

OTHER PUBLICATIONS

Chinese language office action dated Oct. 29, 2020, issued in application No. TW 108129751.
Extended European Search Report dated Apr. 29, 2022, issued in application No. EP 19850921.8.
Schwarz, H., et al:"Non-CE7: Alternative Entropy Coding for dependent quantization;" JVET Meeting; Jul. 2018; pp. 1-48.
Schwarz, H., et al:"Description of Core Experiment 7 (CE 7): Quantization and coefficient coding;" JVET Meeting; Jul. 2018; pp. 1-17.

METHOD AND APPARATUS OF TRANSFORM COEFFICIENT CODING

CROSS REFERENCE TO RELATED APPLICATIONS

The present invention claims priority to U.S. Provisional Patent Application, Ser. No. 62/720,949 filed on Aug. 22, 2018. The U.S. Provisional Patent Application is hereby incorporated by reference in its entirety.

FIELD OF THE INVENTION

The present invention relates to transform coding of prediction residuals in a video encoder or decoder. In particular, the present invention discloses methods for syntax coding of transform coefficients.

BACKGROUND AND RELATED ART

The High Efficiency Video Coding (HEVC) (Rec. ITU-T H.265 ISO/IEC 23008-2 version 3: High efficiency video coding, April, 2015) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into non-overlapped square block regions represented by coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

FIG. 1A illustrates an exemplary adaptive Inter/Intra video coding system incorporating loop processing. For Inter/Intra prediction block 110 generates prediction signal using Inter or Intra prediction adaptive for each coding block (e.g. a CU). The Inter prediction signal may use the current block from the Input video and one or more reference pictures from the Frame Buffer 134 to derive motion estimation. On the other hand, the Intra prediction signal uses the current block from the Input video and neighbouring blocks of the currently reconstructed picture from the reconstruction block (REC) 128 to derive Intra prediction signal. The prediction signal is subtracted from the original signal using the subtractor 116 to generate the residual signal. The residual signal is then processed by transform block (T) 118 and quantization block (Q) 120 to generate quantized-transformed residual (i.e., quantized coefficients), which is further processed by Entropy encoder 122 to be included in the output bitstream. At the encoder side, when an Inter-prediction mode is used, a reference picture or pictures have to be reconstructed at the encoder end as well. When an Intra mode is used, the reconstructed neighbouring blocks will be used. Therefore, an Intra coded block needs to be reconstructed for later use by subsequent blocks coded in the Intra mode. Consequently, the transformed and quantized residues are processed by Inverse Quantization (IQ) 124 and Inverse Transformation (IT) 126 to recover the residues. The reconstructed residues are then added back to prediction signal by the REC 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, Deblocking filter (DF) 130 is often applied to the reconstructed video data before the reconstructed video data are stored in the Frame Buffer 134 in order to improve video quality. Beside deblocking filter, other loop filters (referred as Non-deblocking filters, NDFs) 132, such as Sample Adaptive Offset (SAO) may be used. The system in FIG. 1A is intended to illustrate an exemplary structure of a typical video encoder.

FIG. 1B illustrates a corresponding decoder structure, where most blocks are already used in the encoder. However, at the decoder side, an Entropy Decoder 140 is used instead of the Entropy Encoder 122. Furthermore, the Inter/Intra Prediction Block 150 for the decoder side is different from that at the encoder side since the motion compensation is performed at the decoder side.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signalling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 colour format. An integer transform is applied to a transform block and the level values of quantized coefficients together with other side information are entropy coded in the bitstream. FIG. 2 illustrates an example of the block partitioning 210 and its corresponding QT representation 220. The solid lines indicate the CU boundaries and the dashed lines indicate the TU boundaries.

The terms coding tree block (CTB), coding block (CB), prediction block (PB), and transform block (TB) are defined to specify the 2-D sample array of one colour component associated with CTU, CU, PU and TU, respectively. A CTU consists of one luma CTB, two chroma CTBs, and associated syntax elements. A similar relationship is valid for CU, PU and TU. The tree partitioning is generally applied simultaneously to both luma and chroma, although exceptions apply when certain minimum sizes are reached for chroma.

Joint Video Expert Team (JVET) of ITU-T SG16 WP3 and ISO/IEC JTC1/SC29/WG11 are currently in the process of establishing the next-generation video coding standard. Some promising new coding tools have been adopted into Versatile Video Coding (VVC) Working Draft (WD) 2 (B. Brossey et al., "Versatile Video Coding (Draft 2)," Joint Video Expert Team (JVET) of ITU-T VCEG (Q6/16) and ISO/IEC MPEG (JTC 1/SC 29/WG 11), Doc. JVET-K1001, 11th Meeting: Ljubljana, SI, 10-18 Jul. 2018). In VVC WD 2, each coding tree unit (CTU) can be partitioned into one or more smaller-size coding units (CUs) by a quadtree with nested multi-type tree using binary and ternary split. The resulting CU partitions can be in square or rectangular shapes.

BRIEF SUMMARY OF THE INVENTION

A method and apparatus or decoding prediction residues in a video coding system are disclosed. According to this method, input data associated with a current residual block are received, where the input data correspond to quantized transform coefficients associated with the current residual block to be coded at an encoder side and the input data correspond to coded quantized-transform coefficients associated with the current residual block to be decoded at a decoder side. A first syntax element is signalled at the encoder side or the first syntax element is parswed at the decoder side in a first coding pass for at least one sub-block, wherein the first syntax element indicates whether an absolute value of a current transform coefficient level is greater than 0. A second syntax element is signalled at the encoder side or the second syntax element is parsed at the decoder side in the first coding pass for said at least one sub-block if the first syntax element indicates that the absolute value of the current transform coefficient level is greater than 0, wherein the second syntax element indicates whether the absolute value of the current transform coefficient level is greater than 1. A third syntax element is signalled at the encoder side or the third syntax element is parsed at the decoder side in the first coding pass for said at least one sub-block if the second syntax element indicates that the absolute value of the current transform coefficient level is greater than 1, wherein the third syntax element indicates a parity of the current transform coefficient level. The current residual block is encoded or decoded using information comprising the first syntax element, the second syntax element, and the third syntax element.

In one embodiment, the first syntax element corresponds to sig_coeff_flag, the second syntax element corresponds to coeff_abs_level_greater1_flag, and the third syntax element corresponds to par_level_flag. In one embodiment, the method further comprises signalling a fourth syntax element at the encoder side or parsing the fourth syntax element at the decoder side in a second coding pass for said at least one sub-block if the second syntax element indicates that the absolute value of the current transform coefficient level is greater than 1, wherein the fourth syntax element indicates whether the absolute value of the current transform coefficient level downward shifted by 1 is greater than 1. In another embodiment, the method further comprises signalling a fifth syntax element at the encoder side or parsing the fifth syntax element at the decoder side in a third coding pass for said at least one sub-block if the fourth syntax element indicates that the absolute value of the current transform coefficient level downward shifted by 1 is greater than 1, wherein the fifth syntax element indicates a remaining absolute value of the current transform coefficient level. In yet another embodiment, the method further comprises signalling a sixth syntax element at the encoder side or parsing the sixth syntax element at the decoder side in a fourth coding pass for said at least one sub-block if the first syntax element indicates that the absolute value of the current transform coefficient level is greater than 0, wherein the sixth syntax element indicates a sign of the current transform coefficient level.

In another embodiment, the method comprises signalling a fourth syntax element at the encoder side or parsing the fourth syntax element at the decoder side in a first coding pass for said at least one sub-block if the second syntax element indicates that the absolute value of the current transform coefficient level is greater than 1, wherein the fourth syntax element indicates whether the absolute value of the current transform coefficient level downward shifted by 1 is greater than 1. In one embodiment, the first syntax element corresponds to sig_coeff_flag, the second syntax element corresponds to coeff_abs_level_greater1_flag, and the third syntax element corresponds to par_level_flag. The fourth syntax element corresponds to coeff_abs_level_rs1_gt1_flag. A partially reconstructed absolute value of the current transform coefficient level (AbsLevelPass1) from the first coding pass is given by: AbsLevelPass1=2*(coeff_abs_level_greater1_flag+ coeff_abs_level_rs1_gt1_flag)+ParityBit. When the fourth syntax element is equal to 0, the absolute value of the current transform coefficient level downward shifted by 1 is set equal to 1. When the fourth syntax element indicates that the absolute value of the current transform coefficient level downward shifted by 1 is greater than 1, a fifth syntax element is signalled or parsed in a second coding pass to indicate a remaining absolute value of the current transform coefficient level. For example, the fifth syntax element corresponds to abs_remainder. When the first syntax element indicates that the absolute value of the current transform coefficient level is greater than 0, a sixth syntax element is signalled or parsed in a third coding pass to indicate a sign of the current transform coefficient level. If the sixth syntax element is equal to 0, the current transform coefficient level has a positive value; and if the sixth syntax element is equal to 1, the current transform coefficient level has a negative value.

Non-state-dependent scalar quantization can be used to generate the quantized transform coefficients at the encoder side or non-state-dependent scalar de-quantization is used to de-quantize the coded quantized-transform coefficients at the decoder side. In another embodiment, state-dependent scalar quantization is used to generate the quantized transform coefficients at the encoder side or state-dependent scalar de-quantization is used to de-quantize the coded quantized-transform coefficients at the decoder side.

DETAILED DESCRIPTION OF THE INVENTION

Figure 1A:
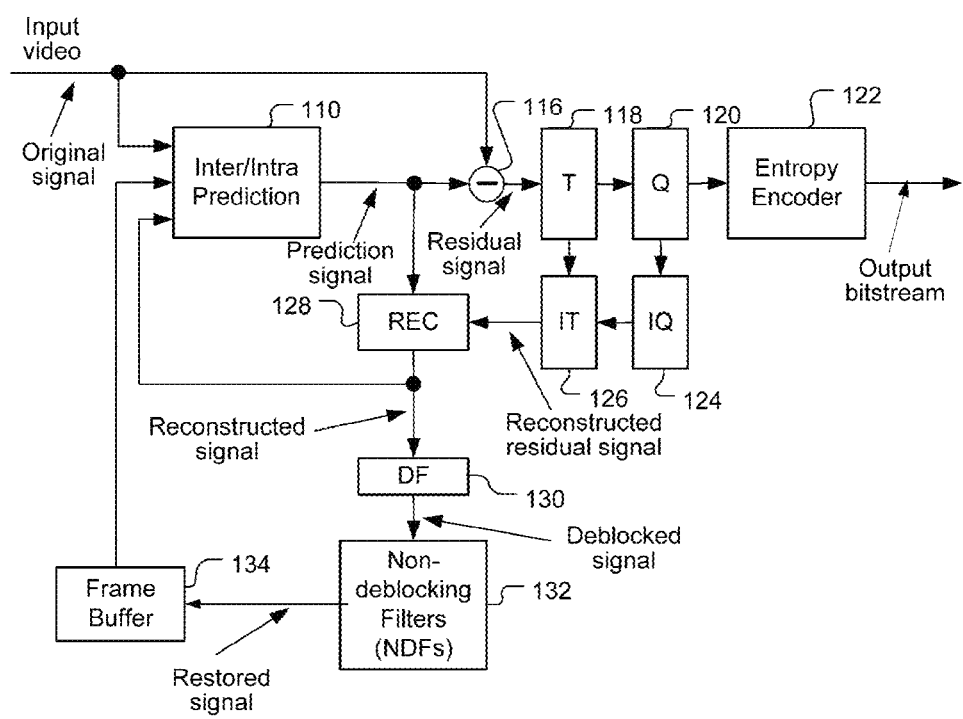
FIG. 1A illustrates an exemplary adaptive Inter/Intra video encoding system incorporating loop processing.
Figure 1B:
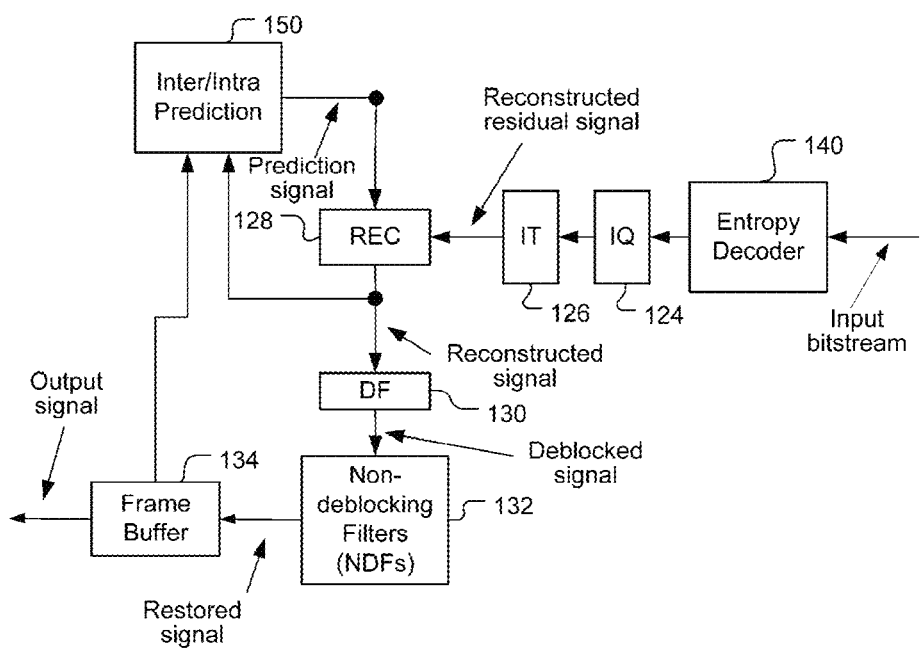
FIG. 1B illustrates an exemplary adaptive Inter/Intra video decoding system incorporating loop processing.
Figure 2:
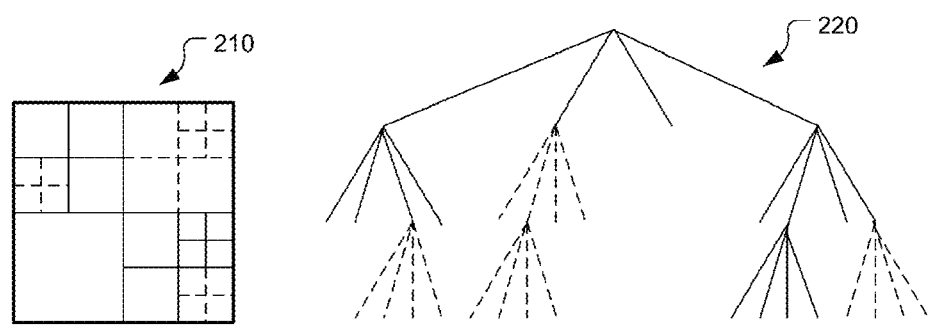
FIG. 2 illustrates an example of block partition using quadtree structure to partition a coding tree unit (CTU) into coding units (CUs).

The following description is of the best-contemplated mode of carrying out the invention. This description is made for the purpose of illustrating the general principles of the invention and should not be taken in a limiting sense. The scope of the invention is best determined by reference to the appended claims.

In HEVC and VVC WD 2, the coded block flag (CBF) is utilized to signal whether there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A non-zero transform block is further divided into non-overlapped sub-blocks. A syntax element coded_sub_block_flag may be signalled to indicate whether a current sub-block contains at least one nonzero coefficients. When coded_sub_block_flag is equal to 0, the associated transform sub-block is not further coded and all the coefficients in the current transform sub-block are inferred to be equal to 0. Otherwise (i.e., coded_sub_block_flag=1), the associated transform block contains at least one non-zero transform coefficient. The values of the transform coefficient levels in the associated sub-block are entropy coded using multiple sub-block coding passes. In each coding pass, the individual transform coefficients are visited once according to a pre-defined scanning order.

In HEVC, a syntax element sig_coeff_flag is signalled in the first sub-block coding pass to indicate whether the absolute value of a current transform coefficient level is greater than 0. The syntax element sig_coeff_flag is signalled for all sub-blocks in the current block at the encoder side or parsed for all sub-blocks in the current block at the decoder side before further syntax coding. The first round of syntax coding for sub-blocks in the current block is referred as the first coding pass. A syntax element coeff_abs_level_greater1_flag is further signalled in the second coding pass for a current coefficient with sig_coeff_flag equal to 1 to indicate whether the absolute value of the associated transform coefficient level is greater than 1. A syntax element coeff_abs_level_greater2_flag is further signalled in the third coding pass for a current coefficient with coeff_abs_level_greater1_flag equal to 1 to indicate whether the absolute value of the associated transform coefficient level is greater than 2. The sign information and the remaining level values are further signalled in the fourth coding and fifth sub-block coding passes, respectively.

In VVC WD 2, the transform coefficients may be quantized by dependent scalar quantization (referred as state-dependent scalar quantization in this disclosure). The selection of one of the two quantizers is specified by a state machine with four states. The state for a current transform coefficient is determined by the state and the parity of the absolute level value for the preceding transform coefficient in a scanning order. The syntax elements sig_coeff_flag, par_level_flag and rem_abs_gt1_flag are signalled in the first sub-block coding pass. par_level_flag[n] specifies the parity of the transform coefficient level at scanning position n. When par_level_flag[n] is not present, it is inferred to be equal to 0. rem_abs_gt1_flag[n] specifies whether the syntax element rem_abs_gt1_flag[n] is present for the scanning position n. When rem_abs_gt1_flag[n] is not present, it is inferred to be equal to 0. The partially reconstructed absolute value of a transform coefficient level from the first pass is given by:

$$AbsLevelPass1 = sig\_coeff\_flag + par\_level\_flag + 2 * rem\_abs\_gt1\_flag.$$

Context selection for entropy coding sig_coeff_flag is dependent on the state for the current coefficient. par_level_flag is thus signalled in the first coding pass for deriving the state for the next coefficient. The syntax elements rem_abs_gt2_flag, abs_remainder, and coeff_sign_flag are further signalled in the second, third, and fourth coding passes, respectively. rem_abs_gt2_flag[n] specifies whether the syntax element abs_remainder[n] is present for the scanning position n. When rem_abs_gt2_flag[n] is not present, it is inferred to be equal to 0. abs_remainder[n] is the remaining absolute value of a transform coefficient level that is coded with Golomb-Rice code at the scanning position n. When abs_remainder[n] is not present, it is inferred to be equal to 0. coeff_sign_flag[n] specifies the sign of a transform coefficient level for scanning position n as follows:

If coeff_sign_flag[n] is equal to 0, the corresponding transform coefficient level has a positive value.

Otherwise (i.e., coeff_sign_flag[n] is equal to 1), the corresponding transform coefficient level has a negative value.

When coeff_sign_flag[n] is not present, it is inferred to be equal to 0. The fully reconstructed absolute value of a transform coefficient level is determined according to:

$$AbsLevel = AbsLevelPass1 + 2*(rem\_abs\_gt2\_flag + abs\_remainder).$$

The transform coefficient level is determined according to:

$$TransCoeffLevel = (2*AbsLevel - (QState>1\ ?1:0))*(1 - 2*coeff\_sign\_flag),$$

where QState indicates the state for the current transform coefficient.

Aspects of the present invention relate to entropy coding the transform coefficient levels generated by dependent scalar quantization (i.e., state-dependent scalar quantization) as specified in VVC WD 2. However, the present invention can also be applied to transform coefficient levels generated by conventional scalar quantization (referred as non-state-dependent scalar quantization in this disclosure). According to a method of the present invention, the absolute value of a transform coefficient level may be signalled using multiple coding passes. The fully reconstructed absolute value of a transform coefficient level can be represented by:

$$AbsLevel = (AbsLevelRS1 << 1) + ParityBit,$$

where ParityBit indicates the parity of the absolute value of a transform coefficient level and AbsLevelRS1 indicates the absolute value of a transform coefficient level downward shifted by 1. As is known in the field, the operation of downward shift (i.e., right shift) by 1 is equivalent to dividing by 2. The syntax elements sig_coeff_flag, coeff_abs_level_greater1_flag and par_level_flag may be signalled in the first coding pass. When sig_coeff_flag is equal to 0, the associated transform coefficient level is equal to 0. Otherwise (i.e., sig_coeff_flag=1), coeff_abs_level_greater1_flag is further signalled to indicate whether the absolute value of the associated transform coefficient level is greater than 1. When coeff_abs_level_greater1_flag is equal to 0, AbsLevelRS1 is set equal to 0 and ParityBit is set equal to sig_coeff_flag for the associated transform coefficient. Otherwise (i.e., coeff_abs_level_greater1_flag=1), par_level_flag is further signalled to indicate the value of ParityBit for the associated transform coefficient level. The information about AbsLevelRS1 and the sign for the associated transform coefficient level can be further signalled using one or more coding passes.

When coeff_abs_level_greater1_flag is greater than 1 for a current coefficient, the method of the present invention may further signal a syntax element, coeff_abs_level_rs1_gt1_flag to indicate whether AbsLevelRS1 is greater than 1. For coefficient absolute values equal to 0 and 1, the absolute value of a transform coefficient level downward shifted (i.e., AbsLevelRS1) by 1 is equal to 0. For coefficient absolute values equal to 2 and 3, the absolute value of a transform coefficient level downward shifted (i.e., AbsLevelRS1) by 1 is equal to 1. For coefficient absolute values equal to 4 or larger, the absolute value of a transform coefficient level downward shifted (i.e., AbsLevelRS1) by 1 is equal to 2 or larger (i.e greater than 1). In other words, coeff_abs_level_rs1_gt1_flag has the same meaning as coefficient absolute value greater than 3. When coeff_abs_level_rs1_gt1_flag is equal to 0, AbsLevelRS1 is set equal to 1 for the associated transform coefficient level. Otherwise (i.e., coeff_abs_level_rs1_gt1_flag=1), AbsLevelRS1 is inferred to be greater than 1 and the remaining value of AbsLevelRS1 is further signalled. In one embodiment, the syntax element coeff_abs_level_rs1_gt1_flag is signalled in the same coding pass as coeff_abs_level_greater1_flag. In another embodiment, coeff_abs_level_rs1_gt1_flag is signalled in a separate coding pass after the coding pass for signalling coeff_abs_level_greater1_flag.

When coeff_abs_level_rs1_gt1_flag is greater than 1 for a current coefficient, the method of the present invention may further signal a syntax element coeff_abs_level_rs1_gt2_flag to indicate whether AbsLevelRS1 is greater than 2. Similar explanation applied to coeff_abs_level_rs1_gt1_flag can be applied to coeff_abs_level_rs1_gt2_flag. Accordingly, coeff_abs_level_rs1_gt2_flag has the same meaning as coefficient absolute value greater than 5. When coeff_abs_level_rs1_gt2_flag is equal to 0, AbsLevelRS1 is set equal to 2 for the associated transform coefficient level. Otherwise (i.e., coeff_abs_level_rs1_gt2_flag=1), AbsLevelRS1 is inferred to be greater than 2 and the remaining value of AbsLevelRS1 is further signalled. coeff_abs_level_rs1_gt2_flag may be signalled in the same coding pass as coeff_abs_level_rs1_gt1_flag or signalled in a separate coding pass after the coding pass for signalling coeff_abs_level_rs1_gt1_flag. In one embodiment, syntax elements coeff_abs_level_greater1_flag, coeff_abs_level_rs1_gt1_flag and coeff_abs_level_rs1_gt2_flag are all signalled in one coding pass.

In one embodiment, the method of the present invention is employed for entropy coding the residual block quantized by dependent scalar quantization in VVC WD 2. The method of the present invention utilizes the syntax elements sig_coeff_flag, coeff_abs_level_greater1_flag, par_level_flag, coeff_abs_level_rs1_gt1_flag, coeff_abs_level_rs1_gt2_flag, and coeff_abs_level_rs1_remainder for coding the absolute value of a transform coefficient level. Table 1 provides the modified syntax table to VVC WD 2 using the method of the present invention for decoding a residual transform block. The syntax element coeff_abs_level_rs1_remainder is employed to signal the remaining absolute value of an associated coefficient level when coeff_abs_level_rs1_gt2_flag is equal to 1. The syntax elements sig_coeff_flag, coeff_abs_level_greater1_flag, coeff_abs_level_rs1_gt1_flag, coeff_abs_level_rs1_gt2_flag, and coeff_abs_level_rs1_remainder are inferred to be equal to 0 when not coded.

TABLE 1

| Modified residual coding syntax | Descriptor | Note |
|---|---|---|
| residual_coding( x0, y0, log2TbWidth, log2TbHeight, cIdx ) { | | |
|   if( transform_skip_enabled_flag && | | |
|   ( cIdx != 0 \|\| cu_mts_flag[ x0 ][ y0 ] = = 0 ) && | | |
|   ( log2TbWidth <= 2 ) && ( log2TbHeight <= 2 ) ) | | |
|     transform_skip_flag[ x0 ][ y0 ][ cIdx ] | ae(v) | |
|   last_sig_coeff_x_prefix | ae(v) | |
|   last_sig_coeff_y_prefix | ae(v) | |
|   if( last_sig_coeff_x_prefix > 3 ) | | |
|     last_sig_coeff_x_suffix | ae(v) | |
|   if( last_sig_coeff_y_prefix > 3 ) | | |
|     last_sig_coeff_y_suffix | ae(v) | |
|   log2SbSize = ( Min( log2TbWidth, log2TbHeight ) < 2 ? 1 : 2 ) | | |
|   numSbCoeff = 1 << ( log2SbSize << 1 ) | | |
|   lastScanPos = numSbCoeff | | |
|   lastSubBlock = ( 1 << ( log2TbWidth + log2TbHeight − 2 * log2SbSize ) ) − 1 | | |
|   do { | | |
|     if( lastScanPos = = 0 ) { | | |
|       lastScanPos = numSbCoeff | | |
|       lastSubBlock− − | | |
|     } | | |
|     lastScanPos− − | | |
|     xS = DiagScanOrder[ log2TbWidth − log2SbSize ][ log2TbHeight − log2SbSize ][ lastSubBlock ][ 0 ] | | |
|     yS = DiagScanOrder[ log2TbWidth − log2SbSize ][ log2TbHeight − log2SbSize ][ lastSubBlock ][ 1 ] | | |
|     xC = ( xS << log2SbSize ) + DiagScanOrder[ log2SbSize ][ log2SbSize ][ lastScanPos ][ 0 ] | | |
|     yC = ( yS << log2SbSize ) + DiagScanOrder[ log2SbSize ][ log2SbSize ][ lastScanPos ][ 1 ] | | |
|   } while( ( xC != LastSignificantCoeffX ) \|\| ( yC != | | |

TABLE 1-continued

Modified residual coding syntax

| | Descriptor | Note |
|---|---|---|
| LastSignificantCoeffY ) )<br>QState = 0<br>for( i = lastSubBlock; i >= 0; i− − ) {<br>  startQStateSb = QState<br>  xS =<br>DiagScanOrder[ log2TbWidth − log2SbSize ][ log2TbHeight − log2SbSize ]<br>  [ lastSubBlock ][ 0 ]<br>  yS =<br>DiagScanOrder[ log2TbWidth − log2SbSize ][ log2TbHeight − log2SbSize ]<br>  [ lastSubBlock ][ 1 ]<br>  inferSbDcSigCoeffFlag = 0<br>  if( ( i < lastSubBlock ) && ( i > 0 ) ) {<br>    coded_sub_block_flag[ xS ][ yS ]<br>    inferSbDcSigCoeffFlag = 1<br>  }<br>  firstSigScanPosSb = numSbCoeff<br>  lastSigScanPosSb = −1<br>  for( n = ( i = = lastSubBlock ) ? lastScanPos − 1 : numSbCoeff − 1; n<br>  >= 0; n− − ) {<br>    xC = ( xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if( coded_sub_block_flag[ xS ][ yS ] && (n > 0 | |<br>!inferSbDcSigCoeffFlag ) ) {<br>      sig_coeff_flag[ xC ][ yC ]<br>    }<br>    ParityBit[n] = sig_coeff_flag[ xC ][ yC ]<br>    if( sig_coeff_flag[ xC ][ yC ] ) {<br>      if( lastSigScanPosSb = = −1 )<br>        lastSigScanPosSb = n<br>      firstSigScanPosSb = n<br>      coeff_abs_level_greater1_flag [ n ]<br>      if( coeff_abs_level_greater1_flag [ n ] ) {<br>        par_level_flag[ n ]<br>        coeff_abs_level_rs1_gt1_flag [ n ]<br>        ParityBit[n] = par_level_flag[ n ]<br>      }<br>    }<br>    AbsLevelPass1[ xC ][ yC ] =<br>    2 * ( coeff_abs_level_greater1_flag[ n ] +<br>    coeff_abs_level_rs1_gt1_flag[ n ] ) +<br>    ParityBit[ n ]<br>    if( dep_quant_enabled_flag )<br>      QState = QStateTransTable[ QState ][ ParityBit[ n ] ]<br>  }<br>  for( n = numSbCoeff − 1; n >= 0; n− − ) {<br>    if(coeff_abs_level_rs1_gt1_flag [ n ] )<br>      coeff_abs_level_rs1_gt2_flag [ n ]<br>  }<br>  for( n = numSbCoeff − 1; n >= 0; n− − ) {<br>    xC = ( xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if(coeff_abs_level_rs1_gt2_flag[ n ] )<br>      coeff_abs_level_rs1_remainder[ n ]<br>    AbsLevel[ xC ][ yC ] = AbsLevelPass1[ xC ][ yC ] +<br>    2 * (coeff_abs_level_rs1_gt2_flag [ n ] +<br>    coeff_abs_level_rs1_remainder [ n ] )<br>  }<br>  if( dep_quant_enabled_flag | | !sign_data_hiding_enabled_flag )<br>    signHidden = 0<br>  else<br>    signHidden = ( lastSigScanPosSb − firstSigScanPosSb > 3 ? 1 : 0<br>  )<br>  for( n = numSbCoeff − 1; n >= 0; n− − ) {<br>    xC = (xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if( sig_coeff_flag[ xC ][ yC ] &&<br>  ( !signHidden | | ( n != firstSigScanPosSb ) ) )<br>      coeff_sign_flag[ n ] | | |
| | ae(v) | |
| | ae(v) | (1) |
| | ae(v) | (2) |
| | ae(v) | (3) |
| | ae(v) | (4) |
| | | (5) |
| | ae(v) | |
| | ae(v) | |

TABLE 1-continued

Modified residual coding syntax

|  | Descriptor | Note |
|---|---|---|

```
        }
   if( dep_quant_enabled_flag ) {
       QState = startQStateSb
       for( n = numSbCoeff − 1; n >= 0; n− − ) {
           xC = ( xS << log2SbSize ) +
           DiagScanOrder[ log2SbSize ][ log2SbSize ][ n ][ 0 ]
           yC = ( yS << log2SbSize ) +
           DiagScanOrder[ log2SbSize ][ log2SbSize ][ n ][ 1 ]
           if( sig_coeff_flag[ xC ][ yC ] )
               TransCoeffLevel[ x0 ][ y0 ][ cIdx ][ xC ][ yC ] =
               ( 2 * AbsLevel[ xC ][ yC ] − ( QState > 1 ? 1 : 0 ) ) *
               ( 1 − 2 * coeff_sign_flag[ n ] )
           QState = QStateTransTable[ QState ][ ParityBit [ n ] ]
       } else {
           sumAbsLevel = 0
           for( n = numSbCoeff − 1; n >= 0; n− − ) {
               xC = ( xS << log2SbSize ) +
               DiagScanOrder[ log2SbSize ][ log2SbSize ][ n ][ 0 ]
               yC = ( yS << log2SbSize ) +
               DiagScanOrder[ log2SbSize ][ log2SbSize ][ n ][ 1 ]
               if( sig_coeff_flag[ xC ][ yC ] ) {
                   TransCoeffLevel[ x0 ][ y0 ][ cIdx ][ xC ][ yC ] =
                   AbsLevel[ xC ][ yC ] * ( 1 − 2 * coeff_sign_flag[ n ] )
                   if( signHidden ) {
                       sumAbsLevel += AbsLevel[ xC ][ yC ]
                       if( ( n = = firstSigScanPosSb ) && ( sumAbsLevel % 2 )
                                   = = 1 ) )
                           TransCoeffLevel[ x0 ][ y0 ][ cIdx ][ xC ][ yC ] =
                           −TransCoeffLevel[ x0 ][ y0 ][ cIdx ][ xC ][ yC ]
                   }
               }
           }
       }
   }
   if( cu_mts_flag[ x0 ][ y0 ] && ( cIdx = = 0 ) &&
       !transform_skip_flag[ x0 ][ y0 ][ cIdx ] &&
       ( ( CuPredMode[ x0 ][ y0 ] = = MODE_INTRA && numSigCoeff > 2
                                                               ) | |
         ( CuPredMode[ x0 ][ y0 ] = = MODE_INTER ) ) ) {
           mts_idx[ x0 ][ y0 ]                          ae(v)
   }
```

In Table 1, syntax elements sig_coeff_flag[xC][yC], coeff_abs_level_greater1_flag [n], par_level_flag[n], and coeff_abs_level_rs1_gt1_flag [n] are signal for a sub-block located at [xC][yC] in the first pass for a coefficient at scanning position n as indicated by notes (1), (2), (3) and (4) respectively. An example of the partially reconstructed absolute value of a transform coefficient level from the first pass (i.e., AbsLevelPass1) is given as indicated by Note (5):

AbsLevelPass1[$xC$][$yC$]=2*
(coeff_abs_level_greater1_flag[$n$]+
coeff_abs_level_$rs$1_$gt$1_flag[$n$])+ParityBit[$n$].

Another aspect of the present invention relates to complexity reduction by reducing the number of coding passes for entropy coding a transform block or a sub-block. In one example, the syntax element rem_abs_gt2_flag in VVC WD 2 may be coded in the same coding pass as rem_abs_gt1_flag. In another example, the information on the signs and remaining values of transform coefficients are often entropy coded in a bypass mode and may be signalled in one coding pass. In one embodiment, all syntax elements entropy coded in a CABAC regular mode are signalled in one coding pass. All syntax elements entropy coded in CABAC bypass mode are signalled in another coding pass.

Any of the foregoing proposed methods can be implemented in encoders and/or decoders. For example, any of the proposed methods can be implemented in an entropy coding module of an encoder, and/or an entropy coding module of a decoder. Alternatively, any of the proposed methods can be implemented as a circuit integrated to the entropy coding module of the encoder and/or the entropy coding module of the decoder.

The foregoing proposed methods can be applied to a system using conventional scalar quantization (i.e., non-state-dependent scalar quantization) or state-dependent scalar quantization.

Figure 3:
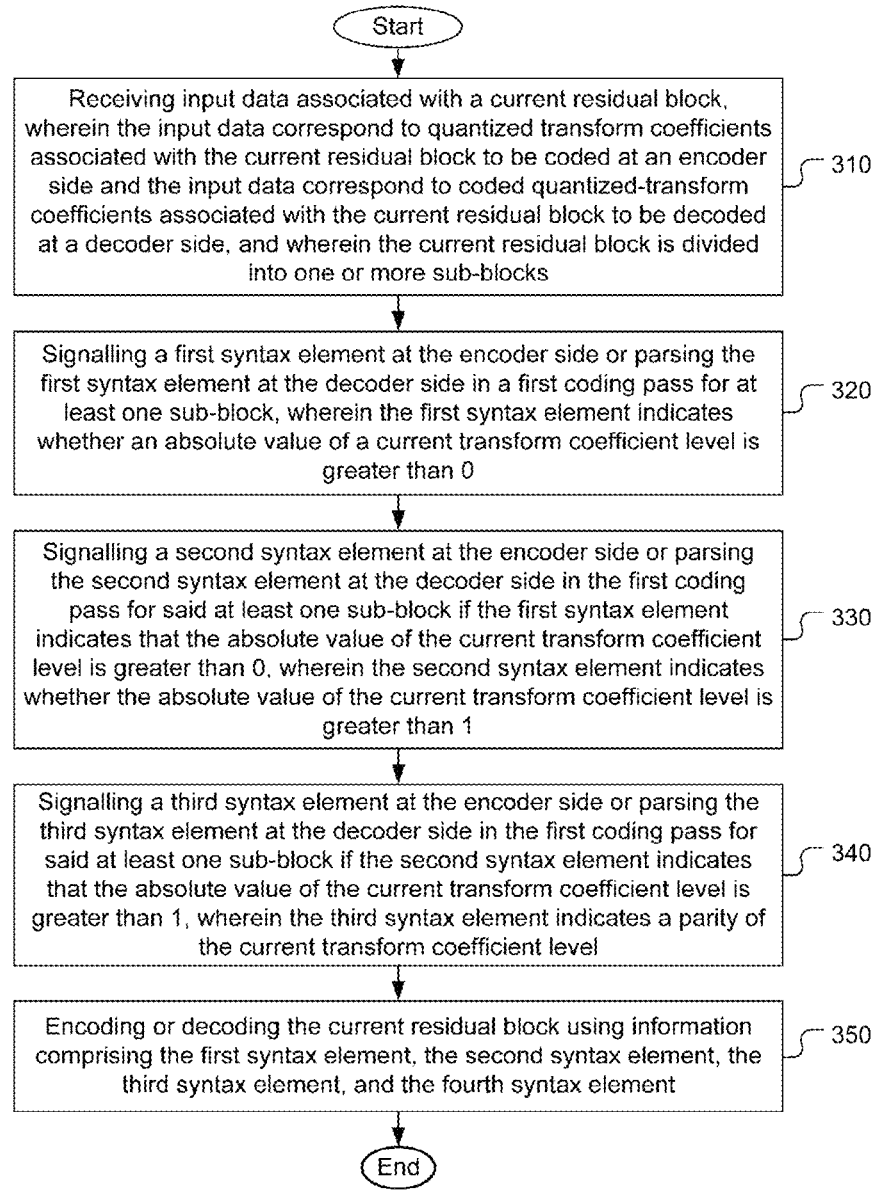
FIG. 3 illustrates a flowchart of an exemplary coding system incorporating syntax coding for residual signals according to an embodiment of the present invention.

FIG. 3 illustrates a flowchart of an exemplary coding system incorporating syntax coding for residual signals according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current residual block are received in step 310, where the input data correspond to quantized transform coefficients associated with the current residual block to be coded at an encoder side and the input data correspond to coded quantized-transform coefficients associated with the current residual block to be decoded at a decoder side, and wherein the current residual block is divided into one or more sub-blocks. A first syntax element is signalled at the encoder side or the first syntax element is parsed at the decoder side in a first coding pass for at least one sub-block in step 320, wherein the first syntax element indicates whether an absolute value of a current transform coefficient level is greater than 0. A second syntax element is signalled at the encoder side or the second syntax element is parseed at the decoder side in the first coding pass for said at least one sub-block if the first syntax element indicates that the absolute value of the current transform coefficient level is greater than 0 in step 330, wherein the second syntax element indicates whether the absolute value of the current transform coefficient level is greater than 1. A third syntax element is signalled at the encoder side or the third syntax element is parsed at the decoder side in the first coding pass for said at least one sub-block if the second syntax element indicates that the absolute value of the current transform coefficient level is greater than 1 in step 340, wherein the third syntax element indicates a parity of the current transform coefficient level. The current residual block is encoded or decoded using information comprising the first syntax element, the second syntax element, and the third syntax element in step 350.

Figure 4:
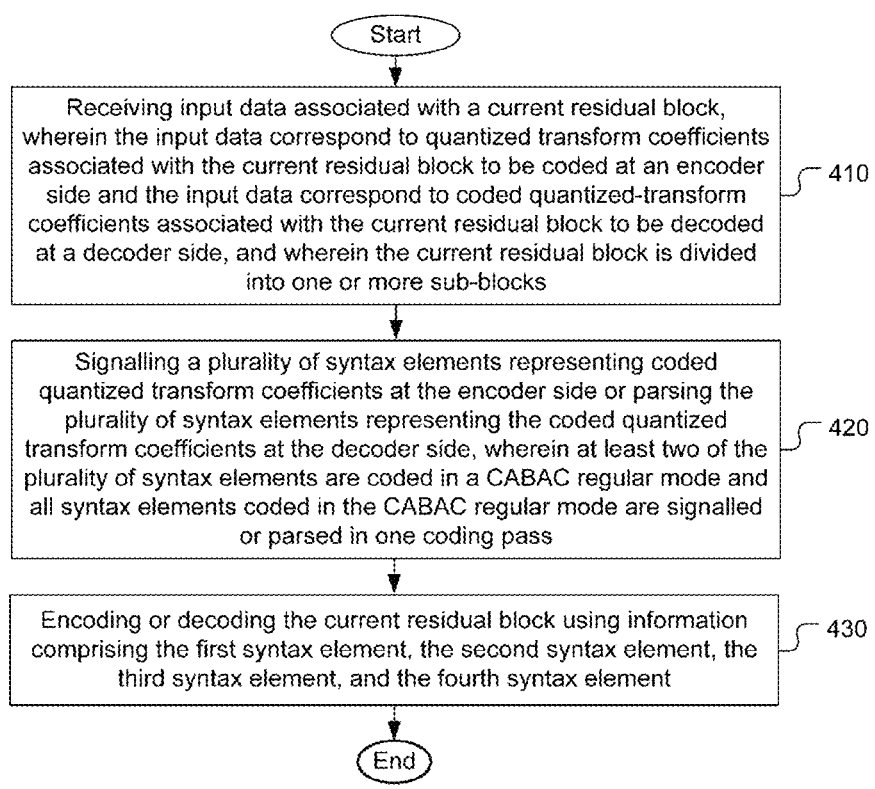
FIG. 4 illustrates a flowchart of another exemplary coding system incorporating syntax coding for residual signals according to an embodiment of the present invention.

FIG. 4 illustrates a flowchart of another exemplary coding system incorporating syntax coding for residual signals according to an embodiment of the present invention. According to this method, input data associated with a current residual block are received in step 410, where the input data correspond to quantized transform coefficients associated with the current residual block to be coded at an encoder side and the input data correspond to coded quantized-transform coefficients associated with the current residual block to be decoded at a decoder side, and wherein the current residual block is divided into one or more sub-blocks. A plurality of syntax elements representing coded quantized transform coefficients is signalled at the encoder side or parsed at the decoder side in step 420, wherein at least two of the plurality of syntax elements are coded in a CABAC regular mode and all syntax elements coded in the CABAC regular mode are signalled or parsed in one coding pass. The current residual block is encoded or decoded using information comprising the first syntax element, the second syntax element, and the third syntax element in step 430.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding or decoding prediction residues in a video coding system, the method comprising:
   receiving input data associated with a current residual block, wherein the input data correspond to quantized transform coefficients associated with the current residual block to be coded at an encoder side and the input data correspond to coded quantized-transform coefficients associated with the current residual block to be decoded at a decoder side, and wherein the current residual block is divided into one or more sub-blocks;
   signalling a first syntax element at the encoder side or parsing the first syntax element at the decoder side in a first coding pass for at least one sub-block, wherein the first syntax element indicates whether an absolute value of a current transform coefficient level is greater than 0;
   signalling a second syntax element at the encoder side or parsing the second syntax element at the decoder side in the first coding pass for said at least one sub-block if the first syntax element indicates that the absolute value of the current transform coefficient level is greater than 0, wherein the second syntax element indicates whether the absolute value of the current transform coefficient level is greater than 1;
   signalling a third syntax element at the encoder side or parsing the third syntax element at the decoder side in the first coding pass for said at least one sub-block if the second syntax element indicates that the absolute value of the current transform coefficient level is greater than 1, wherein the third syntax element indicates a parity of the current transform coefficient level; and encoding or decoding the current residual block using information comprising the first syntax element, the second syntax element, and the third syntax element.

2. The method of claim 1, wherein the first syntax element corresponds to sig_coeff_flag, the second syntax element corresponds to coeff_abs_level_greater1_flag, and the third syntax element corresponds to par_level_flag.

3. The method of claim 1, comprising signalling a fourth syntax element at the encoder side or parsing the fourth syntax element at the decoder side in a second coding pass for said at least one sub-block if the second syntax element indicates that the absolute value of the current transform coefficient level is greater than 1, wherein the fourth syntax element indicates whether the absolute value of the current transform coefficient level downward shifted by 1 is greater than 1.

4. The method of claim 3, comprising signalling a fifth syntax element at the encoder side or parsing the fifth syntax element at the decoder side in a third coding pass for said at least one sub-block if the fourth syntax element indicates that the absolute value of the current transform coefficient level downward shifted by 1 is greater than 1, wherein the fifth syntax element indicates a remaining absolute value of the current transform coefficient level.

5. The method of claim 4, comprising signalling a sixth syntax element at the encoder side or parsing the sixth syntax element at the decoder side in a fourth coding pass for said at least one sub-block if the first syntax element indicates that the absolute value of the current transform coefficient level is greater than 0, wherein the sixth syntax element indicates a sign of the current transform coefficient level.

6. The method of claim 1, comprising signalling a fourth syntax element at the encoder side or parsing the fourth syntax element at the decoder side in a first coding pass for said at least one sub-block if the second syntax element indicates that the absolute value of the current transform coefficient level is greater than 1, wherein the fourth syntax element indicates whether the absolute value of the current transform coefficient level downward shifted by 1 is greater than 1.

7. The method of claim 6, wherein the first syntax element corresponds to sig_coeff_flag, the second syntax element corresponds to coeff_abs_level_greater1_flag, and the third syntax element corresponds to par_level_flag.

8. The method of claim 7, wherein the fourth syntax element corresponds to coeff_abs_level_rs1_gt1_flag.

9. The method of claim 8, wherein a partially reconstructed absolute value of the current transform coefficient level (AbsLevelPass1) from the first coding pass is given by:

AbsLevelPass1=2*(coeff_abs_level_greater1_flag+ coeff_abs_level_rs1_gt1_flag)+ParityBit.

10. The method of claim 7, wherein when the fourth syntax element is equal to 0, the absolute value of the current transform coefficient level downward shifted by 1 is set equal to 1.

11. The method of claim 7, wherein when the fourth syntax element indicates that the absolute value of the current transform coefficient level downward shifted by 1 is greater than 1, a fifth syntax element is signalled or parsed in a second coding pass to indicate a remaining absolute value of the current transform coefficient level.

12. The method of claim 11, wherein the fifth syntax element corresponds to abs_remainder.

13. The method of claim 11, wherein when the first syntax element indicates that the absolute value of the current transform coefficient level is greater than 0, a sixth syntax element is signalled or parsed in a third coding pass to indicate a sign of the current transform coefficient level.

14. The method of claim 13, wherein if the sixth syntax element is equal to 0, the current transform coefficient level has a positive value; and if the sixth syntax element is equal to 1, the current transform coefficient level has a negative value.

15. The method of claim 6, wherein non-state-dependent scalar quantization is used to generate the quantized transform coefficients at the encoder side or non-state-dependent scalar de-quantization is used to de-quantize the coded quantized-transform coefficients at the decoder side.

16. The method of claim 6, wherein state-dependent scalar quantization is used to generate the quantized transform coefficients at the encoder side or state-dependent scalar de-quantization is used to de-quantize the coded quantized-transform coefficients at the decoder side.

17. The method of claim 1, wherein non-state-dependent scalar quantization is used to generate the quantized transform coefficients at the encoder side or non-state-dependent scalar de-quantization is used to de-quantize the coded quantized-transform coefficients at the decoder side.

18. The method of claim 1, wherein state-dependent scalar quantization is used to generate the quantized transform coefficients at the encoder side or state-dependent scalar de-quantization is used to de-quantize the coded quantized-transform coefficients at the decoder side.

19. An apparatus for encoding or decoding prediction residues in a video coding system, the apparatus comprising one or more electronic circuits or processors arranged to:
receive input data associated with a current residual block, wherein the input data correspond to quantized transform coefficients associated with the current residual block to be coded at an encoder side and the input data correspond to coded quantized-transform coefficients associated with the current residual block to be decoded at a decoder side, and wherein the current residual block is divided into one or more sub-blocks;
signal a first syntax element at the encoder side or parse the first syntax element at the decoder side in a first coding pass for at least one sub-block, wherein the first syntax element indicates whether an absolute value of a current transform coefficient level is greater than 0;
signal a second syntax element at the encoder side or parse the second syntax element at the decoder side in the first coding pass for said at least one sub-block if the first syntax element indicates that the absolute value of the current transform coefficient level is greater than 0, wherein the second syntax element indicates whether the absolute value of the current transform coefficient level is greater than 1;
signal a third syntax element at the encoder side or parse the third syntax element at the decoder side in the first coding pass for said at least one sub-block if the second syntax element indicates that the absolute value of the current transform coefficient level is greater than 1, wherein the third syntax element indicates a parity of the current transform coefficient level; and
encode or decode the current residual block using information comprising the first syntax element, the second syntax element, and the third syntax element.

20. The apparatus of claim 19, comprising signalling a fourth syntax element at the encoder side or parsing the fourth syntax element at the decoder side in a first coding pass for said at least one sub-block if the second syntax element indicates that the absolute value of the current transform coefficient level is greater than 1, wherein the fourth syntax element indicates whether the absolute value of the current transform coefficient level downward shifted by 1 is greater than 1.

\* \* \* \* \*